(12) United States Patent
Elsbree et al.

(10) Patent No.: US 6,360,358 B1
(45) Date of Patent: Mar. 19, 2002

(54) MAINTENANCE OF CODE KNOWLEDGE FOR UP-TO-DATE ACCESS THEREOF

(75) Inventors: John E. Elsbree, Redmond; Randy S. Kimmerly, Woodinville; Anders Hejlsberg, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/266,621

(22) Filed: Mar. 11, 1999

(51) Int. Cl.[7] ................................................ G06F 9/44
(52) U.S. Cl. .................. 717/3; 717/2; 717/8; 707/102; 709/318
(58) Field of Search ..................... 717/3, 2, 8; 707/102, 707/103 R, 104; 709/318, 328, 330

(56) References Cited

U.S. PATENT DOCUMENTS

| | | | | |
|---|---|---|---|---|
| 5,701,490 A | * | 12/1997 | Safonov | ........................ 717/5 |
| 5,903,725 A | * | 5/1999 | Colyer | ........................ 707/103 |
| 5,999,988 A | * | 12/1999 | Pelegri-Llopart et al. | ... 709/304 |
| 6,182,155 B1 | * | 1/2001 | Cheng et al. | ................ 709/315 |
| 6,185,728 B1 | * | 2/2001 | Hejlsberg | ........................ 717/1 |

OTHER PUBLICATIONS

Dave et al., "Proxies, Application Interfaces, and Distributed Systems," IEEE 1992, pp. 212–220.*
Menon & LeBlanc, Jr., "Object Replacement using Dynamic Proxy Updates," IEEE 1994, pp. 82–91.*

* cited by examiner

Primary Examiner—Tuan Q. Dam
(74) Attorney, Agent, or Firm—Woodcock Washburn LLP

(57) ABSTRACT

Maintenance of code knowledge for up-to-date access thereof. In one embodiment, a computer-implemented method for providing code knowledge in response to receiving a request for code knowledge regarding a computer program. The method first creates a proxy, then a node to which the proxy is pointed by a unique node key and which includes the code knowledge. The method updates the node as necessary to provide accurate code knowledge. For example, the method sets a flag of the proxy indicating the node as invalid upon a change event. Upon the flag of the proxy indicating the node as invalid, and upon receiving a second request for the code knowledge, the method recreates the node.

21 Claims, 6 Drawing Sheets

MAINTENANCE OF CODE KNOWLEDGE FOR UP-TO-DATE ACCESS THEREOF

FIELD OF THE INVENTION

This invention relates generally to software development tools, and more particularly for the maintenance of code knowledge for up-to-date access thereof by and for such tools.

BACKGROUND OF THE INVENTION

Traditional software development tools are generally limited in the degree of assistance and task automation they provide for the software developers that use them. These limitations can largely be attributed to the lack of up-to-date information that the tools themselves possess about the code being developed. Generally, development tools maintain a textual form of a source code (or, source data) of a computer program being developed. However, deeper representation, derived from processing and analysis of the source text, may not be maintained at all, or may be maintained but not always kept current. As used herein, this deeper representation is referred to generically and in a general sense as code knowledge, since a development tool may put the knowledge to any number of different uses.

Usually, traditional tools gather their code knowledge at infrequent intervals, such as when the user compiles the entire program or saves an individual source file to a storage such as a hard disk drive. During the intervening periods, the derived information becomes Astale,@ as the user changes the source code. The code knowledge in such instances becomes out of date.

A problem in maintaining up-to-date code knowledge is flushing stale information from a system when it has been superseded by newer information. If other parts of the development tool are actively using data, or are merely keeping pointers to the data for subsequent use, it generally is impractical to just destroy the old data. Doing so may require a complex notification scheme, allowing each part of the system to switch over to the new data before the old data can be safely destroyed.

For these and other reasons, there is a need for the present invention.

SUMMARY OF THE INVENTION

The invention provides for maintenance of code knowledge for up-to-date access thereof. In one embodiment, a computer-implemented method for providing code knowledge is in response to receiving a request for code knowledge regarding a computer program. The method first creates a proxy, then a node to which the proxy is pointed by a unique node key and which includes the code knowledge. The method updates the node as necessary to provide accurate code knowledge. For example, in one particular embodiment, the method sets a flag of the proxy indicating the node as invalid upon a change event (e.g., such as modification to the source code from which the code knowledge was parsed occurring). Thus, upon the flag of the proxy indicating the node as invalid, and upon receiving a second request for the code knowledge, the method recreates the node (and, in one embodiment, first deleting the node before recreating it).

Thus, the invention provides for advantages not found in the prior art. Embodiments of the invention solve the problem of maintaining up-to-date code knowledge by introducing a layer of objects called proxies, through which all access to code knowledge is performed. Other parts of the system refer only to these proxies, which are not destroyed when the source text changes (unlike the nodes, for example).

The use of proxies also confers other advantages for the invention. Proxies can transparently derive their knowledge using many different mechanisms—for example, if the source code has not changed since the last time it was compiled, it may be more efficient to derive some of the code knowledge by loading a compiled binary file, rather than by parsing the source code.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Hardware and Operating Environment

Figure 1:
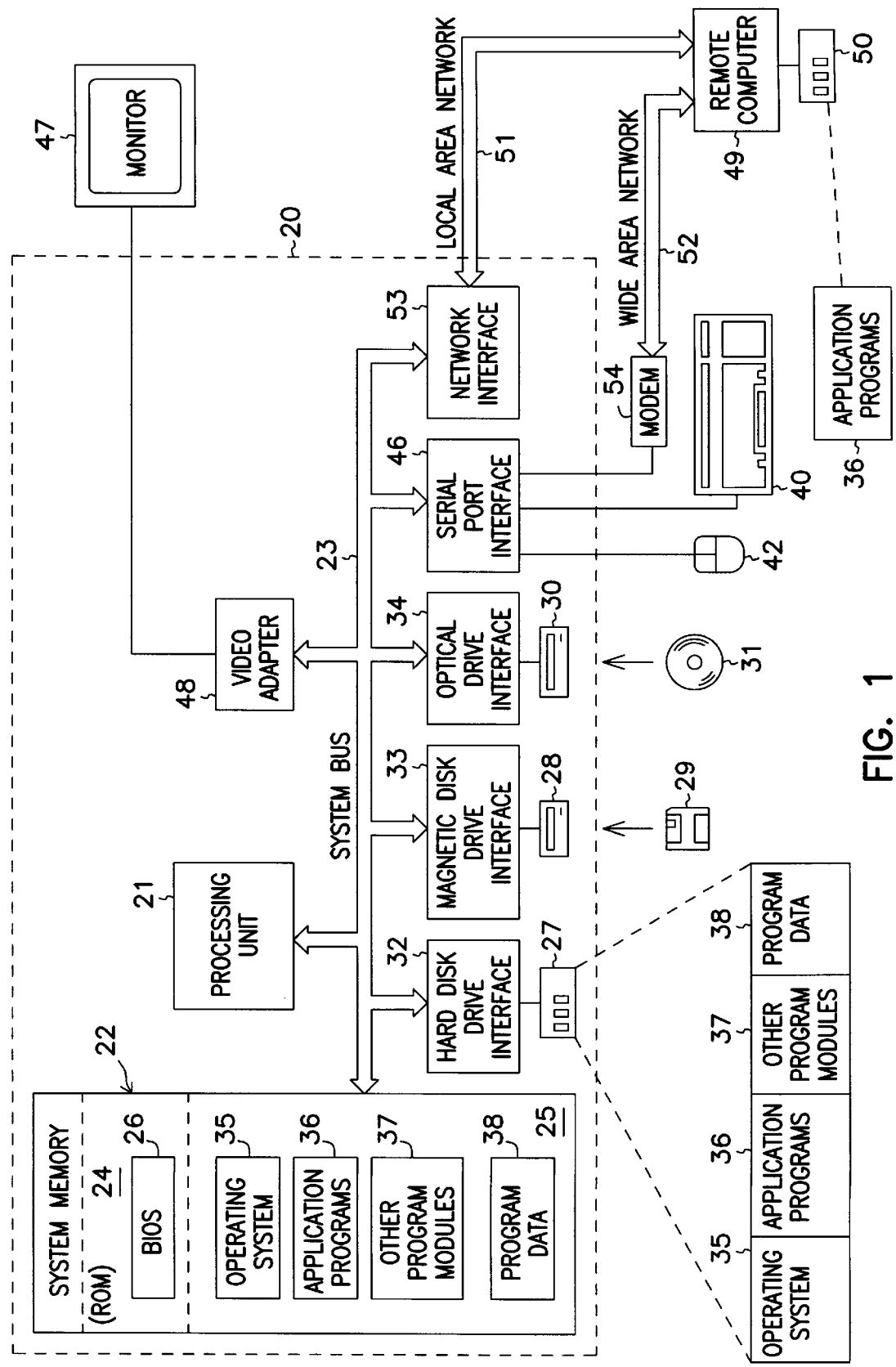
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Operation of an Embodiment of the Invention

In this section of the detailed description, the operation of an embodiment of the invention is described. The operation is described in conjunction with and in reference to FIGS. 2(a)–2(d). Subsequent to the description of the operation of an embodiment of the invention, a specific system embodiment and a specific method embodiment of the invention are described in successive other sections of the detailed description.

Figure 2A:
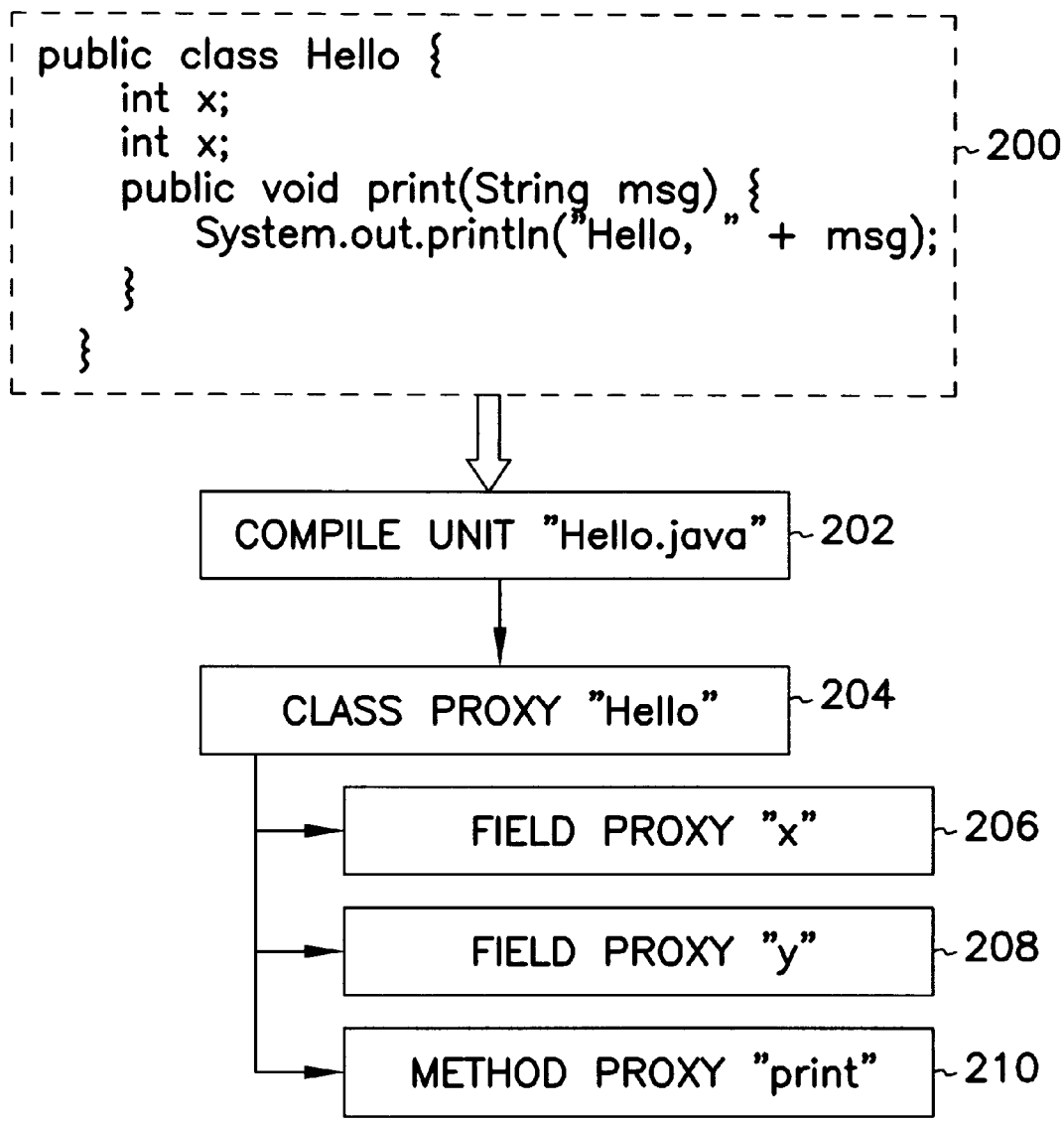
FIGS. 2($a$) through 2($d$) illustrate the operation of the invention, according to one embodiment of the invention.

Referring first to FIG. 2(a), a source data 200 of a computer program is converted into a compile unit 202, having a proxy 204. The source data 200, as well as any other code residing in preexisting libraries, is subdivided into individual units referred to as compile units; the compile unit 202 is one example of such units. For example, for a Java language developmental tool, a compile unit such as the compile unit 202 can correspond to a Java source code file. Each compile unit is an object that serves as a starting point, from which a developmental tool can obtain proxies that represent various elements of the program (and which provide code knowledge regarding those elements).

As shown in FIG. 2(a), the compile unit 202 has the proxy 204, which is in particular a class proxy. Other proxies of the unit 202 shown in FIG. 2(a) include proxies 206, 208 and 210: proxies 206 and 208 are field proxies, and the proxy 210 is a method proxy. Proxy 204 is a class proxy in that it corresponds to a class within the source data 200. Proxies 206 and 208 are field proxies, corresponding to fields of this class. Finally, proxy 210 is a method proxy, corresponding to a method of this class.

In general, the kinds of proxies that can be obtained from the compile unit depend on the capabilities and features of the specific programming language that is being modeled. In the case of the Java language, a source file contains the declarations of one or more classes. So, the compile unit exposes a collection of class proxies. Each proxy object has properties, which are named characteristics with values that can be read and in some cases written. For example, properties on a class proxy can include: the class name (a string), its attributes (public, private, abstract, etc.); its comment block (a reference to a comment proxy, for example); its superclass (a reference to another class proxy); its implemented interfaces (a collection of references to other class proxies); and its members (a collection of references to member proxies). Each member proxy represents a field (data variable) or a method (function) that is part of the class, and has its own properties. Thus, proxies 206, 208 and 210 of FIG. 2(a) are member proxies. The information available from all the proxies is thus the code knowledge of the source data.

Figure 2B:
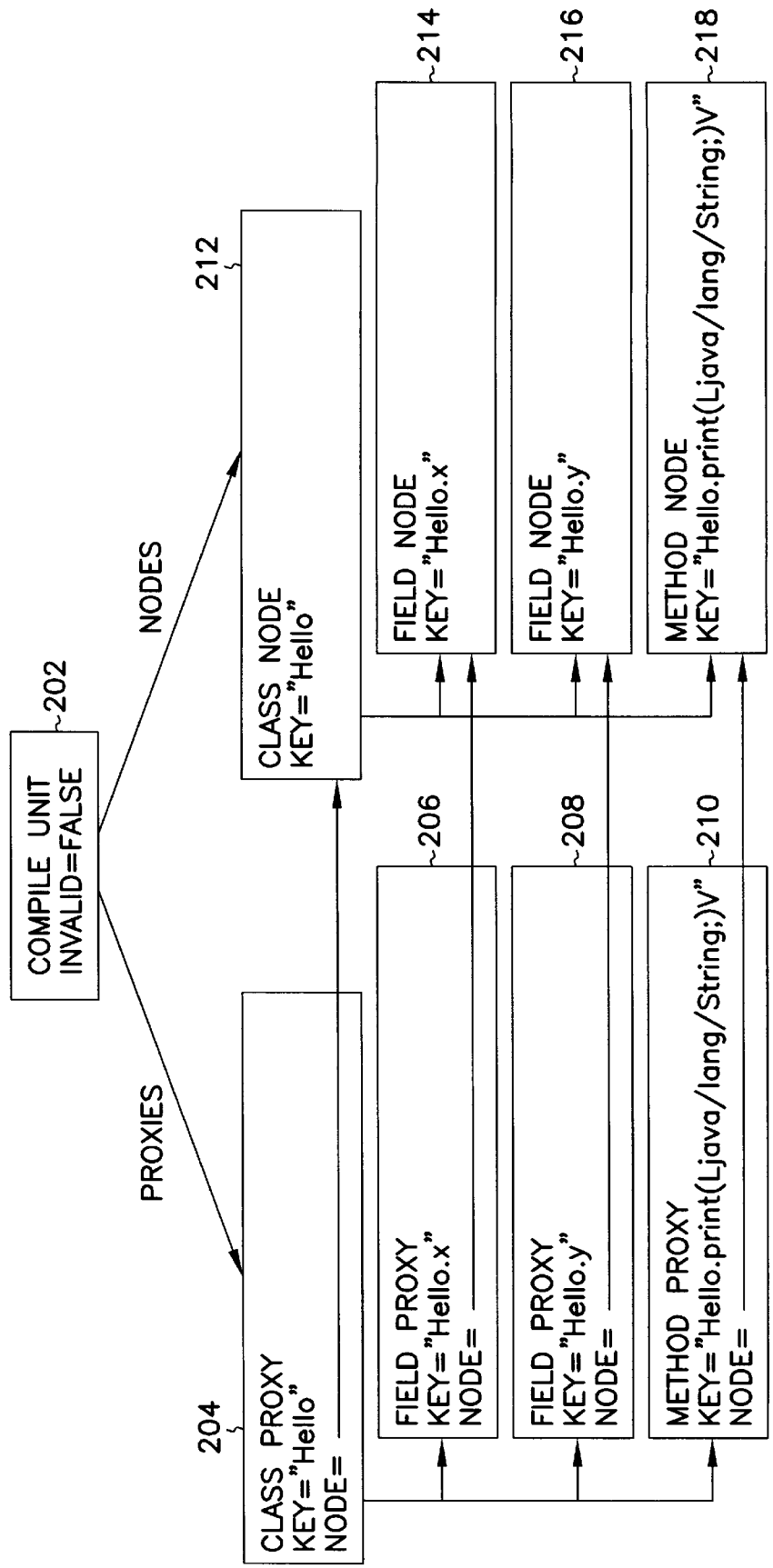

FIG. 2(b) is now referred to. FIG. 2(b) shows that each proxy has a corresponding node. For example, proxy 204 has a corresponding node 212; likewise, proxies 206, 208 and 210 have corresponding nodes 214, 216 and 218, respectively. Generally, most access to properties is read access—a development tool, for example, may want to know the name of a class, or how many members it has. A proxy satisfies these queries by obtaining its data from a corresponding node (also referred to as a node object).

The node objects, such as nodes 214, 216 and 218, are created, on the proxy=s behalf, by its compile unit. The compile unit can decide to replace a node with a different node object at any time. It is noted that while nodes can be replaced, proxies cannot. A proxy remains a viable object for as long as a client—such as the development tool—holds a reference to it. The replacement of the underlying node is desirably invisible to the proxy=s client.

To create a node, a compile unit, such as the compile unit 202, must locate a file that can supply the data needed to populate the node. In the case of Java, for example, it can find much of this information in a compiled binary file (its class file), provided that it exists and is newer than the corresponding source file (its java file). Otherwise, the information is obtained from the source file itself. The compile unit reads the appropriate binary file or source file and constructs a tree that contains nodes representing the elements in the compile units—these nodes are then later associated with proxies, on an as-needed basis.

However, a proxy, when initially created by the compile unit, does not actually contain a pointer to the corresponding node. Instead it contains a string, referred to as a node key, which uniquely identifies its node among all nodes maintained by that compile unit. As shown in FIG. 2(b), for example, the proxy 204 has the node key "Hello," and thus it references the node 212, which has the same node key "Hello." Desirably, the node key is unique, because classes within the same Java compile unit must have unique names. For a member node, in one embodiment, the node key is a concatenation of the class name, member name, and method signature (if any), as is shown in FIG. 2(b).

Thus, when a proxy needs to obtain data from its corresponding node, it asks the compile unit to resolve the key to an actual node. For efficiency purposes, in one embodiment this resolution is performed once, after which the proxy caches the node pointer for subsequent uses.

As has been noted, the compile unit may need to replace the nodes it has created. There arc two main reasons for this. First, the nodes may have been created using data from the compiled binary file, and now data has been requested that is only available from the source file, such as comment text, formal parameter names, source statements, etc. In this case, the compile unit deletes the nodes it built from the binary data and builds a new tree of nodes from the source code. Second, the source code file may have been edited or otherwise modified (desirably, the development tool provides notification of such events). In this case, the compile unit deletes the node, reparses the modified source file, and builds a new tree of nodes. Each of these situations is referred to as a change event in one embodiment.

In each case, the replacement of nodes is accomplishing by setting an invalid flag in the compile unit's internal data, and notifying each of the compile unit's outstanding proxies that its cached pointer is now invalid. For example, in FIG. 2(b), it is shown that the compile unit 202 has an invalid flag set to FALSE, indicating that the nodes are valid—thus, each of the proxies 204, 206, 208 and 210, as shown in FIG. 2(b), points to a valid corresponding node.

Figure 2C:
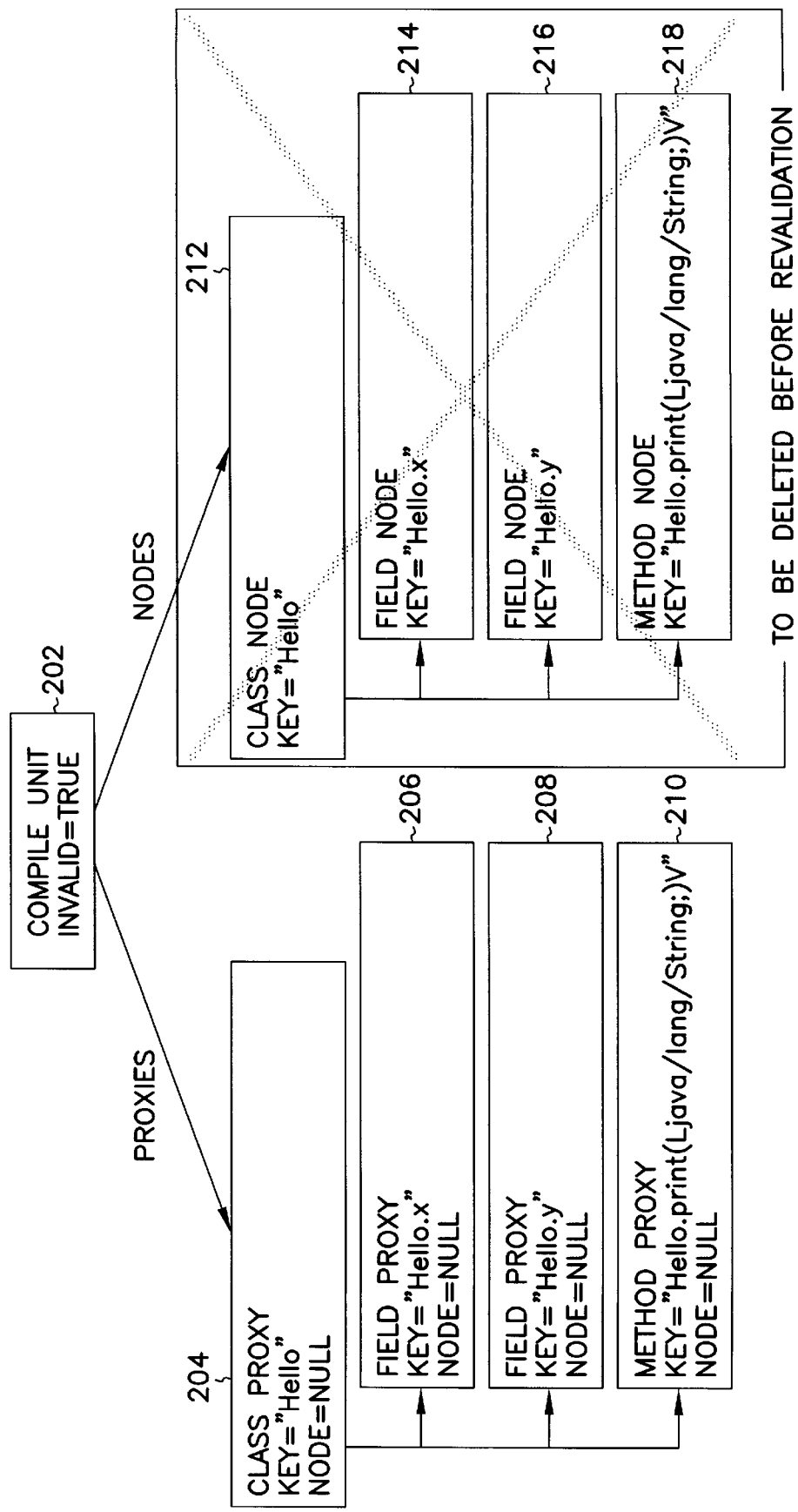

Conversely, referring to FIG. 2(c), a situation now exists where a change event has occurred, such that the nodes 212, 214, 216 and 218 are invalid. Therefore, the invalid flag of the compile unit 202 is set to TRUE, and the compile unit 202 notifies the proxies 204, 206, 208 and 210, such that, as shown in FIG. 2(c), each no longer points to a corresponding node (but rather to NULL). Thus, when the software development tool or other requestor requests code knowledge from a particular proxy, the proxy first determines whether it points to a valid node. If it does not, then the compile unit recreates that node, such that the node key of the proxy is the same as the node key of one of the newly created nodes— and the proxy utilizes the newly created node with the same node key to obtain the requested code knowledge.

As has been described, a proxy remains viable as long as a client (e.g., such as the software development tool or other requestor) holds a reference to it. The proxy is viable in the sense that it is still acceptable to call its methods, without fear of crashing the program due to access violations. However, some changes to the source code underlying the proxy can cause the proxy to no longer be useful, because its node key no longer corresponds to a matching node. Examples of such changes include deleting or renaming a class or member. In these classes, the compile unit will fail to resolve the proxy=s node key to an actual node, because no node with the old name exists. The proxy continues to operate as an object, but because it is unable to connect with a node, all attempts to access its properties (that is, the code knowledge within the node) will fail. By convention, in one embodiment, each proxy has a boolean-valued IsValid property, which indicates whether the proxy can still locate its node. This allows clients (i.e., requestors) to detect when this condition has occurred and take an appropriate recovery action.

Figure 2D:
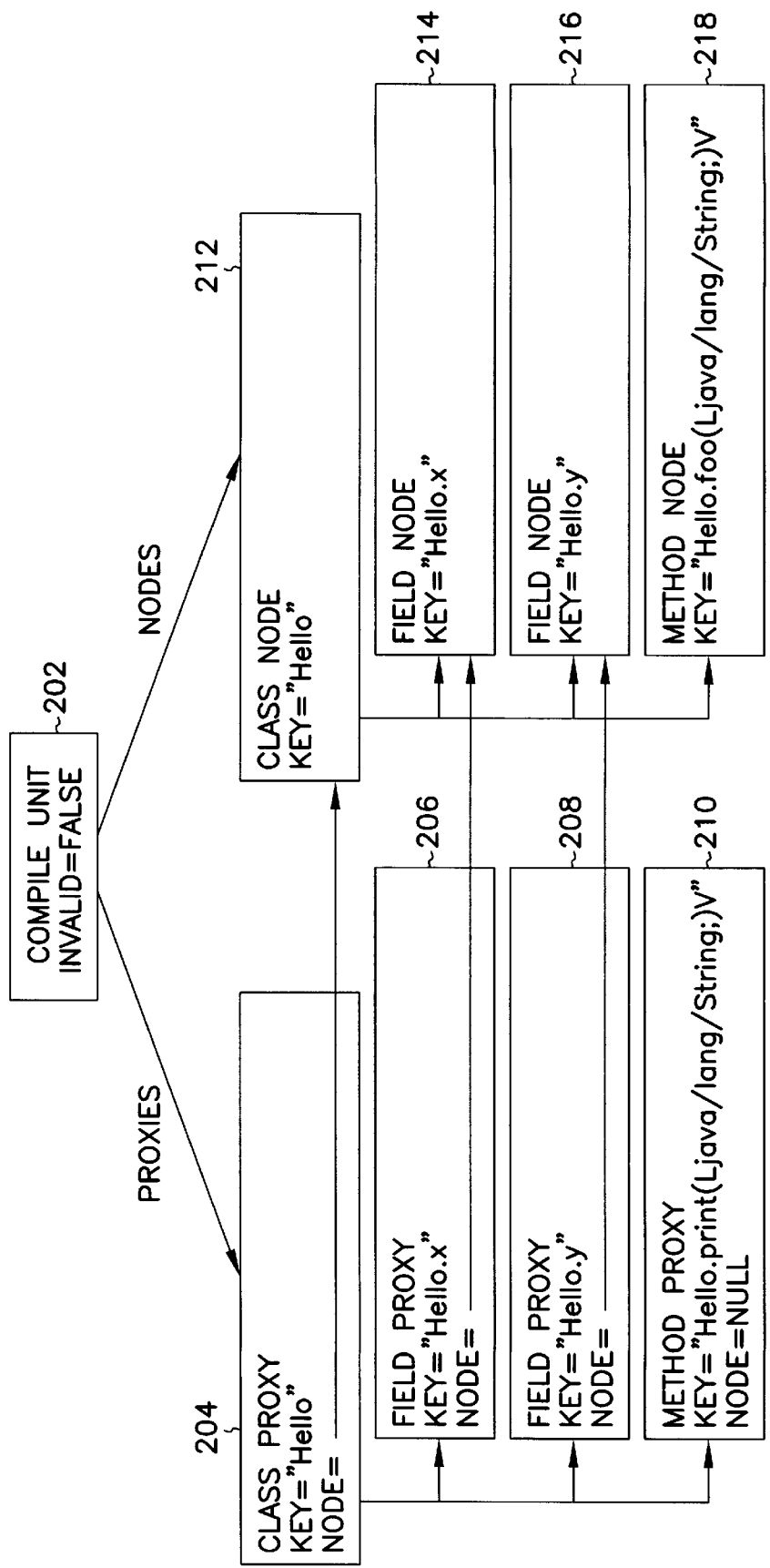

For example, as shown in FIG. 2(d), the method proxy 210 has a key including "Hello.print," because the method for which it was originally created was a method named "print". However, the underlying source data in the situation of FIG. 2(d) has been changed, such that the print method has been renamed to "foo." Thus, the method node 218 has a key including "Hello.foo," such that the method proxy 210 will not be able to have its key resolved to the method node 218—therefore, the method proxy 210 will not be valid, as indicated by the IsValid property.

Furthermore, for some properties of proxies, writing can be permitted in some embodiments of the invention in addition to reading. For example, the name of a class or member can be changed by setting a Name property to a new value. The effect of writing to a property generally implies a change to the source code itself. The internal state of the underlying node must include enough information to pinpoint the location within the source code at which the change should be made. When the change occurs, the development tool sends a change notification, which causes the compile unit to replace its nodes, as has been described.

System

In this section of the detailed description, a system according to an embodiment of the invention is described. The system can in one embodiment be implemented on a computer as is described in the first section of the detailed description. Further, description of the system of one embodiment is made in reference to FIG. 3. In addition, further description regarding components of the system is made by reference to liked name components as described in the previous section of the detailed description.

Figure 3:
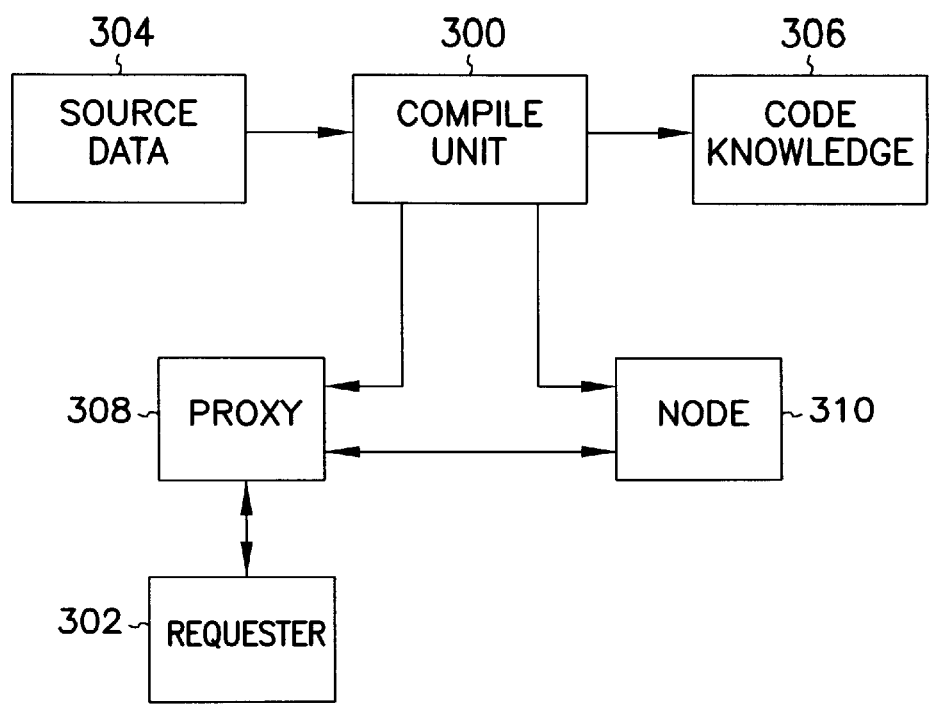
FIG. 3 shows a diagram of a system according to an embodiment of the invention; and, FIG. 4 shows a flowchart of a method according to an embodiment of the invention.

Referring now to FIG. 3, a system according to one embodiment of the invention is shown. The system includes a compile unit 300 and a requester 302. The compile unit 300 parses source data 304 of a computer program into code knowledge 306 regarding the computer program. Not shown is that the compile unit 300 can also parse information stored in already compiled versions of the source data 304, and/or libraries having functions utilized by the source data 304, etc.

The requestor 302 can be a software development tool, or other computer program or software object that desires access to the code knowledge 306. In response to an initial request by the requestor 302 for the code knowledge 306, the compile unit 300 creates proxies, such as the proxy 308, which handle access to the code knowledge, such that the code knowledge is specifically stored in nodes such as the node 310, as has been described in the previous section of the detailed description. The compile unit 300 creates the nodes such as the node 310. Each proxy at least initially has possession of a unique node key to reference B that is, to point to B a corresponding node (having the same unique node key) which includes the code knowledge to which the proxy handles access. As has been described, a proxy may ultimately have possession of a unique node key that has no corresponding node, because of a change in class name, etc.

The compile unit 300 updates the node 310 as necessary so that accurate code knowledge is provided to the requestor 302. This is done essentially on demand by the requestor 302, as has been described, and as is now summarized. Upon a change event, such as when the source data 304 (viz., source code) has been changed, the compile unit 300 sets a validity flag to indicate that the nodes pointed to by their proxies via unique node keys are no longer valid; the compile unit 300 sends a notice to the proxies to indicate to them that their nodes are now invalid. The next time a request is made by the requester 302 of a proxy, the proxy indicates to the compile unit 300 that the node needs to be recreated. The compile unit 300 then reparses the source data 304 to generate the new node; the previous node may first be deleted, however. Thus, upon the invalid flag indicating a node as invalid, and upon the requestor 302 requesting the code knowledge from a proxy, the compile unit 300 recreates the node.

The requestor 302 is able to receive code knowledge as stored in a node such as the node 310 via the proxy for the node, such as the proxy 308. As has been described in the previous section, in some cases the requester 302 may also be able to change the source data by changing the code knowledge in the node, also be request to the proxy for the node.

It is noted that the code knowledge and node shown in FIG. 3 as being separate is in one embodiment only—in another embodiment, for example, the nodes contain the code knowledge, such that frequent recreation and unpredictable recreation of these nodes are the reasons why the proxies exist.

Method

In this section of the detailed description, a computer-implemented method according to an embodiment of the invention is described. The description is provided in reference to FIG. 4. The method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. In addition, further description regarding the method is made by reference to liked name components as described in the previous sections of the detailed description.

Figure 4:
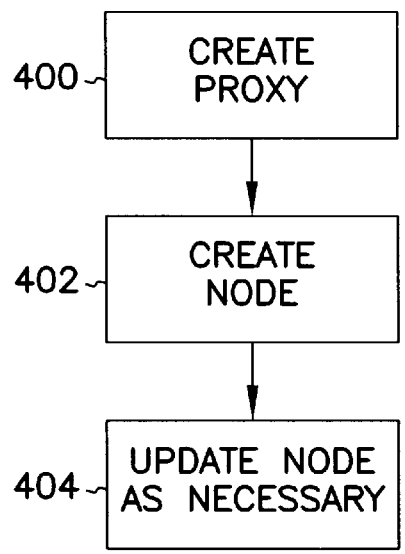

Referring now to FIG. 4, a flowchart of a method according to one embodiment of the invention is shown. The method is for providing code knowledge. The method, for example, can be performed by a compile unit as described in the previous section of the detailed description, although the invention is not so limited. In 400, a proxy is created, in response to first receiving a request for code knowledge regarding a computer program. In 402, a node is created to which the proxy is pointed by a unique node key, and which includes the code knowledge. In one embodiment, this includes first parsing source data of a computer program to the code knowledge for the computer program.

In 404, the node is updated as necessary to provide accurate code knowledge. In one embodiment, this is performed as follows. Upon a change event, such as modification to the source code from which the code knowledge was derived, a flag of the proxy is set to indicate that the node is invalid. Upon receiving another request for the code knowledge, the node is then recreated, including in one embodiment initially deleting the node. Upon recreation, the node then provides accurate information in response to the request, through the proxy.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system for providing code knowledge of a computer program derived from a source data comprising:
   a requester of the code knowledge; and,
   a compile unit to parse the source data into the code knowledge, to create a proxy in response to a request by the requestor for the code knowledge and to create a node to which the proxy is pointed by a unique node key and which includes the code knowledge,
   such that the compile unit is to update the node as necessary to provide accurate code knowledge to the requestor.

2. The system of claim 1, wherein the compile unit is to update the node as necessary, on demand by the requester.

3. The system of claim 1, wherein the code knowledge includes information including at least one of class, attributes, comment, superclass, interfaces, and members.

4. The system of claim 1, wherein the requester receives the code knowledge via the proxy accessing the node as pointed to by the proxy by the unique code key.

5. The system of claim 1, wherein the requestor causes the proxy to modify the source code underlying the code knowledge.

6. The system of claim 1, wherein the proxy includes a flag to indicate validity of the node to which the proxy is pointed by the unique node key.

7. The system of claim 6, wherein the compile unit sets the flag to indicate the node as invalid when the source code has been modified.

8. The system of claim 6, wherein upon the flag indicating the node as invalid and the requestor requesting the code knowledge, the compile unit recreating the node.

9. A computer-implemented method for providing code knowledge comprising:
   in response to receiving a request for code knowledge regarding a computer program, creating a proxy;
   creating a node to which the proxy is pointed by a unique node key and which includes the code knowledge; and,
   updating the node as necessary to provide accurate code knowledge.

10. The method of claim 9, wherein updating the node as necessary comprises updating the node as necessary in response to receiving a second request for the code knowledge.

11. The method of claim 9, further initially comprising parsing source data of the computer program to the code knowledge for the computer program.

12. The method of claim 9, further initially comprising receiving the request for the code knowledge.

13. The method of claim 9, further comprising setting a flag of the proxy indicating the node as invalid upon a change event.

14. The method of claim 13, wherein the change event comprises modification to source code from which the code knowledge was parsed.

15. The method of claim 13, wherein upon the flag of the proxy indicating the node as invalid and upon receiving a second request for the code knowledge, recreating the node.

16. The method of claim 15, wherein recreating the node comprises initially deleting the node.

17. A machine-readable medium having processor instructions stored thereon for execution by a processor to perform a method comprising:
   in response to receiving a request for code knowledge regarding a computer program, creating a proxy;
   creating a node to which the proxy is pointed by a unique node key and which includes the code knowledge; and,
   updating the node as necessary to provide accurate code knowledge.

18. The medium of claim 17, wherein updating the node as necessary comprises updating the node as necessary in response to receiving a second request for the code knowledge.

19. The medium of claim 17, further initially comprising parsing source data of the computer program to the code knowledge for the computer program.

20. The medium of claim 17, further comprising setting a flag of the proxy indicating the node as invalid upon a change event.

21. The medium of claim 17, wherein upon the flag of the proxy indicating the node as invalid and upon receiving a second request for the code knowledge, recreating the node.

* * * * *